(12) United States Patent
Vukovic et al.

(10) Patent No.: US 11,061,718 B2
(45) Date of Patent: Jul. 13, 2021

(54) PATTERN-BASED ARTIFICIAL INTELLIGENCE PLANNER FOR COMPUTER ENVIRONMENT MIGRATION

(71) Applicant: International Business Machines Corporation, Armonk, NY (US)

(72) Inventors: Maja Vukovic, New York, NY (US); Jinho Hwang, Ossining, NY (US); John Rofrano, Mahopac, NY (US); Malik Jackson, Baltimore, MD (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 136 days.

(21) Appl. No.: 16/276,774

(22) Filed: Feb. 15, 2019

(65) Prior Publication Data

US 2020/0264919 A1    Aug. 20, 2020

(51) Int. Cl.
| | |
|---|---|
| *G06F 9/48* | (2006.01) |
| *H04L 29/08* | (2006.01) |
| *G06F 9/50* | (2006.01) |
| *G06N 20/00* | (2019.01) |
| *G06K 9/00* | (2006.01) |
| *H04L 12/24* | (2006.01) |

(52) U.S. Cl.
CPC .......... *G06F 9/4856* (2013.01); *G06F 9/5044* (2013.01); *G06F 9/5055* (2013.01); *G06K 9/00536* (2013.01); *G06N 20/00* (2019.01); *H04L 67/1012* (2013.01); *H04L 41/16* (2013.01)

(58) Field of Classification Search
None
See application file for complete search history.

(56) References Cited

U.S. PATENT DOCUMENTS

| 8,639,638 B2* | 1/2014 | Shae | G06F 16/332 |
| | | | 706/11 |
| 8,943,496 B2* | 1/2015 | Faus | G06F 9/44505 |
| | | | 717/176 |

(Continued)

OTHER PUBLICATIONS

Vukovic et al. "Cloud Migration using Automated Planning", 2016 IEEE, pp. 96-103.*

(Continued)

*Primary Examiner* — Van H Nguyen
(74) *Attorney, Agent, or Firm* — Cantor Colburn LLP; Abdy Raissinia

(57) ABSTRACT

An aspect of the invention includes a method for receiving, using a processor, a request to generate a migration plan for migrating an application from a source environment to a target environment. The request includes configuration parameters of the application. A set of possible actions that can be performed to migrate the application from the source environment to a target environment are identified, using the processor, based at least in part on the configuration parameters of the application. The migration plan is generated, using the processor, based at least in part on the request and the identified set of possible actions. The migration plan specifies a subset of the set of possible actions. The generating of the migration plan includes executing an artificial intelligence (AI) engine to identify patterns in the identified set of possible actions. The migration plan is output.

14 Claims, 10 Drawing Sheets

(56) References Cited

U.S. PATENT DOCUMENTS

| | | | |
|---|---|---|---|
| 9,361,092 B1 | 6/2016 | Bai et al. | |
| 9,515,993 B1 | 12/2016 | Hwang et al. | |
| 9,596,302 B2 * | 3/2017 | Salle | H04L 67/1095 |
| 9,612,765 B2 | 4/2017 | Huang et al. | |
| 9,612,767 B2 * | 4/2017 | Huang | G06F 3/067 |
| 9,729,632 B2 * | 8/2017 | Bai | G06F 9/45558 |
| 9,992,280 B2 * | 6/2018 | Bai | G06F 9/45558 |
| 10,171,310 B2 * | 1/2019 | Hernandez | H04L 41/16 |
| 10,255,136 B2 * | 4/2019 | Salapura | G06F 11/1448 |
| 2014/0122577 A1 * | 5/2014 | Balasubramanian | H04L 43/50 |
| | | | 709/203 |
| 2016/0142261 A1 * | 5/2016 | Huang | H04L 41/0896 |
| | | | 709/223 |
| 2016/0373289 A1 | 12/2016 | Hernandez et al. | |
| 2017/0149687 A1 | 5/2017 | Udupi et al. | |

OTHER PUBLICATIONS

Lee et al. "A Case-Based Planning Approach for Mobile Agents Migration Guidance", 2010 IEEE, pp. 4002-4007.*

Bari et al., "CQNCR: Optimal VM migration planning in cloud data centers," 2014 IFIP Networking Conference, Trondheim, 2014, pp. 1-9.

Menzel et al., "CloudGenius: decision support for web server cloud migration," Proceedings of the 21st international conference on World Wide Web (WWW '2012). ACM, New York, NY, USA, pp. 979-988.

Vukovic et al., "Cloud migration using automated planning," NOMS 2016—2016 IEEE/IFIP Network Operations and Management Symposium, Istanbul, 2016, pp. 96-103.

Wang et al., "On Service Migrations in the Cloud for Mobile Accesses: A Distributed Approach," ACM Trans. Auton. Adapt. Syst. 12, 2, Article 6, May 2017 25 pages.

* cited by examiner

PATTERN-BASED ARTIFICIAL INTELLIGENCE PLANNER FOR COMPUTER ENVIRONMENT MIGRATION

BACKGROUND

The present invention generally relates to planning the migration of computer applications from one environment to another, and more specifically, to a pattern-based artificial intelligence (AI) planner for migrating computer applications into another environment, including, for example, a cloud environment.

Software migration is the practice of transferring data, accounts, and/or functionality from one operating environment (e.g. a source environment) to another (e.g. a target environment). Software migration can also include migrating the same software from one piece of computer hardware to another, or changing both software and hardware simultaneously. Examples of software migration include migration from an on-premises enterprise server to a cloud provider's environment or from one cloud environment to another. As the cloud becomes more diversified, clients have various types of cloud environments to choose from when selecting target cloud platforms for their applications. Target cloud platforms include infrastructure as a service (IaaS), platform as a service (PaaS), and software as a service (SaaS). In some cases, an application in a source environment requires re-platforming and/or re-factoring of applications to be applied in order to move the application to the target cloud environment. Re-factoring refers to the process of restructuring code of an application executing in a source environment to improve its operation in the target cloud environment without changing its external behavior. Re-platforming refers to making one or more updates to an application to optimize it for an infrastructure provided in the source environment. Planning for the migration of an application to a cloud environment can be a complex task that often includes a combination of manual and automated activities.

SUMMARY

According to one or more embodiments of the present invention a non-limiting example computer-implemented method includes receiving, using a processor, a request to generate a migration plan for migrating an application from a source environment to a target environment. The request includes configuration parameters of the application. A set of possible actions that can be performed to migrate the application from the source environment to a target environment are identified, using the processor, based at least in part on the configuration parameters of the application. The migration plan is generated, using the processor, based at least in part on the request and the identified set of possible actions. The generating of the migration plan includes executing an artificial intelligence (AI) engine to identify patterns in the identified set of possible actions. The migration plan specifies a subset of the set of possible actions. The migration plan is output.

Other embodiments of the present invention implement the features of the above-described methods in computer systems and in computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
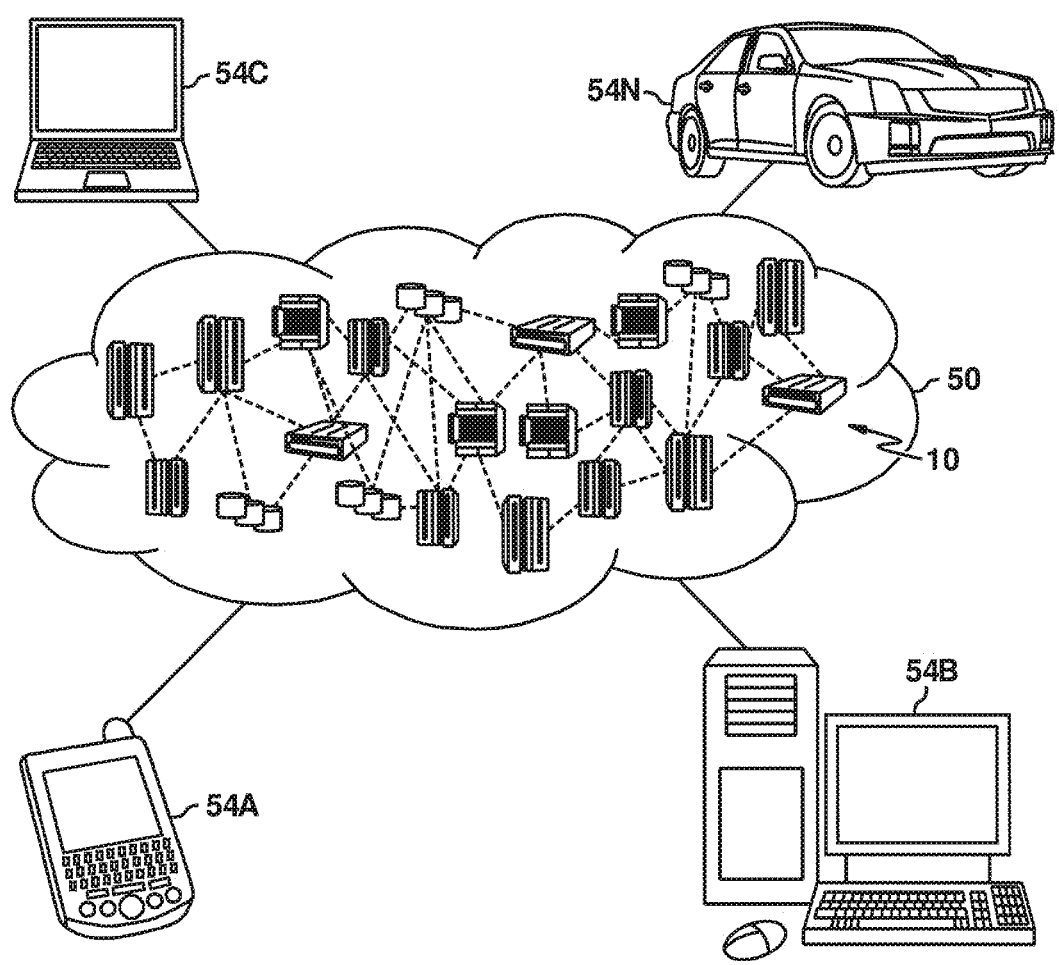
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three-digit reference numbers. With minor exceptions, the leftmost digit(s) of each reference number correspond to the figure in which its element is first illustrated.

DETAILED DESCRIPTION

One or more embodiments of the present invention provide pattern-based artificial intelligence (AI) planning for migrating application software from a source environment to a target environment. In one or more embodiments of the present invention, the target environment is a cloud environment. Constraints and conditions associated with an application being migrated to a cloud environment are specified and input to an AI engine, such as an AI planner, which automatically generates a migration plan for moving the application to the cloud environment. Examples of AI planners that can be utilized by one or more embodiments of the present invention include pattern-based AI planners such as, but not limited to, Fast-Forward and Metric Fast-Forward, both available from the Free Software Foundation, Inc. In accordance with one or more embodiments of the present invention, the AI planner generates a plan that optimizes the amount of time, resources, and/or people required to carry out the migration. One or more embodiments of the present invention can be used for example, by an orchestration engine that plans migration activities and recommends an optimized end-to-end migration plan. Alternatively, one or more embodiments of the present invention can be used for generating a migration plan for a subset of the tasks in a migration process.

As used herein, the term "pattern-based AI planning" refers to making use of migration patterns to drive an AI planning engine. In accordance with one or more embodiments of the present invention, migration patterns are associated with migration actions which include one or more tasks to perform the migration action. A migration pattern is a repeatable form of at least a subset of actions performed to carry out a migration that can be reused or shared. A migration pattern can be created based on user input and/or based on actions, or tasks, performed in previous migrations. Advantages to using pattern-based AI planning include but are not limited to: the repeatability of the migration patterns; a reduction in planning time due to isolating the migration waves, or units, into smaller sets; and the ability for different customers to share migration patterns when the migration patterns are stored in a central location.

In accordance with one or more embodiments of the present invention, the migration plans that are generated can be dynamically adjusted based on user feedback, or user input in real-time while the AI planner is creating the migration plans. In addition, risk measures (e.g., expected application failures due to risk of version mismatches at the target, risk of fewer resources than required at the target, etc.) can be assessed based on different migration patterns, and the risk measures can be factored in by the AI planner by, for example, using the risk factors as constraints or conditions to avoid. One or more embodiments of the present invention implement an active learning methodology with the ability to capture migration patterns. This includes capturing real-time migration pattern data from previous migrations as well as allowing users the ability to provide feedback that can be consumed via a learning engine. As used herein, the term "learning engine" refers to a module that runs machine learning algorithms.

One or more embodiments of the present invention provide data injection to support automated pattern-based AI planning for cloud migration. As used herein, the term "data injection" refers to input data from users such as, but not limited to, migration executors and migration experts. Sources of information input by users are received and analyzed to identify consumable items. As used herein, the term "consumable item" refers to meaningful data that can be used by the AI planner or learning engines (e.g., as features). In accordance with one or more embodiments of the present invention, the data sources are normalized into consumable data sets based on the analysis. In addition, predicates (e.g., an initial state and goals), and actions (e.g., a set of possible actions) from the knowledge data sets, or input sources of information, are identified, and the application(s) to be migrated are categorized into different migration types such as, but not limited to retain, retire, re-host, re-platform, re-factor, and re-architect. The predicates and actions are encoded into a domain specific language and input to the AI planner.

In accordance with one or more embodiments of the present invention, an application categorized as having a migration type of retain will not be migrated to the target environment but will remain executing in the source environment, and an application categorized with a migration type of retire will not be migrated to the target environment and will no longer be executed in the source environment. In accordance with one or more embodiments of the present invention, an application categorized as having a migration type of re-host is migrated as-is from the source environment to the host environment, and an application categorized as having a migration type of re-platform will include making one or more updates to the application to optimize it for an infrastructure provided in the source environment. In accordance with one or more embodiments of the present invention, an application having a migration category of re-factor or re-architect will have its code restructured to improve its operation in the target cloud environment without changing its external behavior.

Commercially available or custom built AI planners may be utilized by one or more embodiments of the present invention. A typical AI planner receives a description of an initial state, a description of desired goals, and a set actions that can be performed to reach the desired goals, all encoded in a formal domain specific language such as, but not limited to, planning domain definition language (PDDL). The AI planner produces a (potentially partially ordered) set of tasks that represent at least a subset of the actions that lead from the initial state to a state satisfying the desired goals. Automated AI planners find the transformations to apply in each given state out of a set of possible transformations for that state. An example AI planner that can be utilized by one or more embodiments of the present invention includes, but is not limited to Metric-FF. Other AI planners having slightly different syntax or format can also be utilized by one or more embodiments of the present invention.

In accordance with one or more embodiments of the present invention, the initial state input to the AI planner includes information about the current environment of the application such as, but not limited to, a state of "not-migrated" or a state of "migration-ready." The description of desired goals input to the AI planner can include, but is not limited to, a state of "migrated" and a target environment. In accordance with one or more embodiments of the present invention, the initial state and desired goals are input to an AI planner as a problem file and specified for example, in PDDL. The set of actions input to the AI planer can include, but are not limited to, "take-down-application" and "shut-down-server." In accordance with one or more embodiments of the present invention, the set of actions are input to an AI planner as a domain file and specified for example, in PDDL.

One or more embodiments of the present invention provide technological improvements over current cloud migration planning techniques that include manual processes performed by migration planning personnel. Disadvantages of manually generating migration plans are that it is often time consuming, error prone, and requires vast domain knowledge of services, infrastructure, networking, etc. on the part of the migration planning personnel in both the current application environments and the target cloud environments. One or more embodiments of the present invention automate the process of generating cloud migration plans to reduce the amount of manual effort required of migration planning personnel. In addition, automating the generation of cloud migration plans can eliminate, or greatly reduce, the number of errors encountered when the application is deployed on the target cloud environment. This reduced threat of human mistakes can lead to improvements in system availability, as well as a decrease in the use of processor and human resources to detect and correct errors.

Another disadvantage of current manual approaches to migration planning is that manual approaches often do not lead to optimized migration plans due to the number of data points and factors that have to be taken into consideration when building a migration plan. By automating the process, one or more embodiments of the present invention can provide optimized migration plans that minimize an amount of time and resources (human and computing) required to perform the migration.

One or more embodiments of the present invention can be utilized to shorten migration planning time from months to days, and thus save labor efforts and time. In addition, possible migration failures can be prevented by using AI planning engines and a feedback loop to factor client feedback into migration planning. Further, migration patterns of previous migration plans are utilized by one or more embodiments of the present invention to create and optimize current migration plans, and to proactively recommend actions to reduce the risk of future migrations failing based on lessons learned from previous migrations that might have failed.

One or more embodiments of the present invention provide technological improvements over current cloud migration planning techniques that include predicates and actions in the AI planning space being manually hardcoded, or in some cases converted from other existing sources. A disadvantage of contemporary techniques is that new sources of information cannot be considered without making manual updates to the predicates and actions, and then recreating the problem and domain files that are input to the AI planner to create a migration plan. One or more embodiments of the present invention normalize ambiguous input sources of information to create consumable datasets that are used to create the problem and domain files. One or more embodiments of the present invention allow the migration planning to be more dynamic by allowing injection of knowledge about the domain in real-time while the AI planner is creating a migration plan. By being able to quickly acquire and utilize new knowledge, the amount of time that it takes to model the application domain can be reduced. In addition, the domain can be proactively expanded based on changing operational knowledge.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
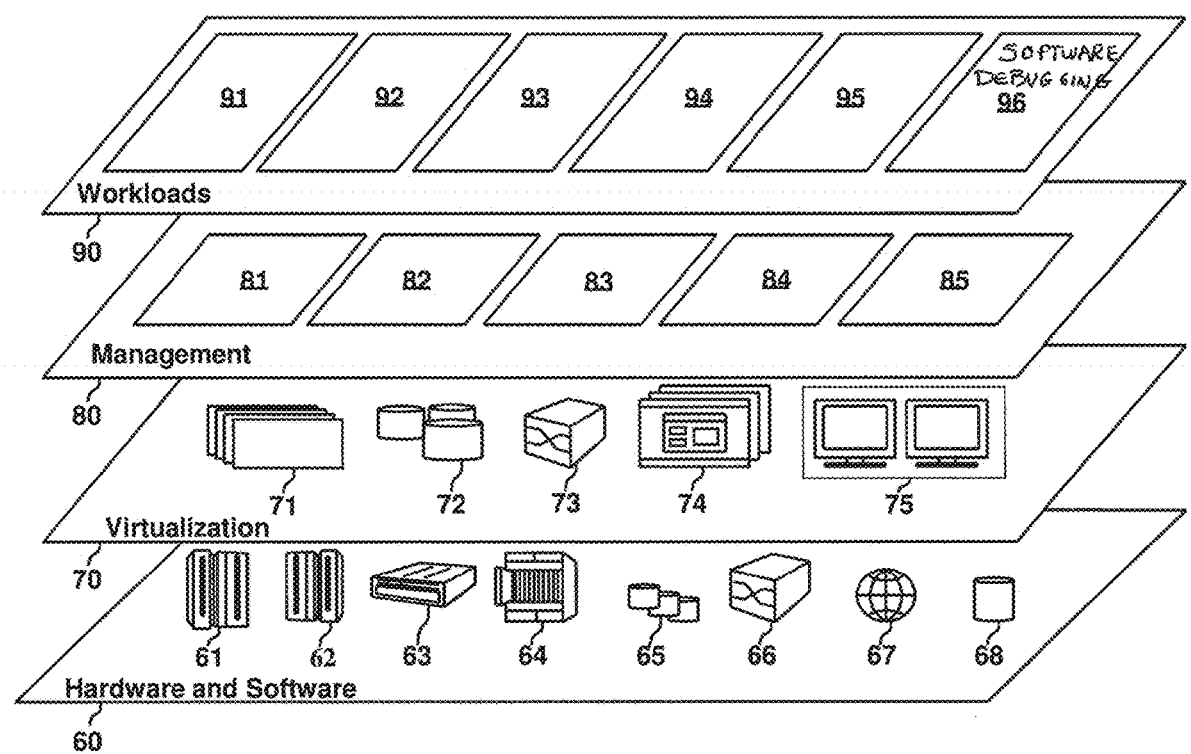
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, for example, software components include network application server software 67, database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and AI planners for environment/platform migration 96.

Figure 3:
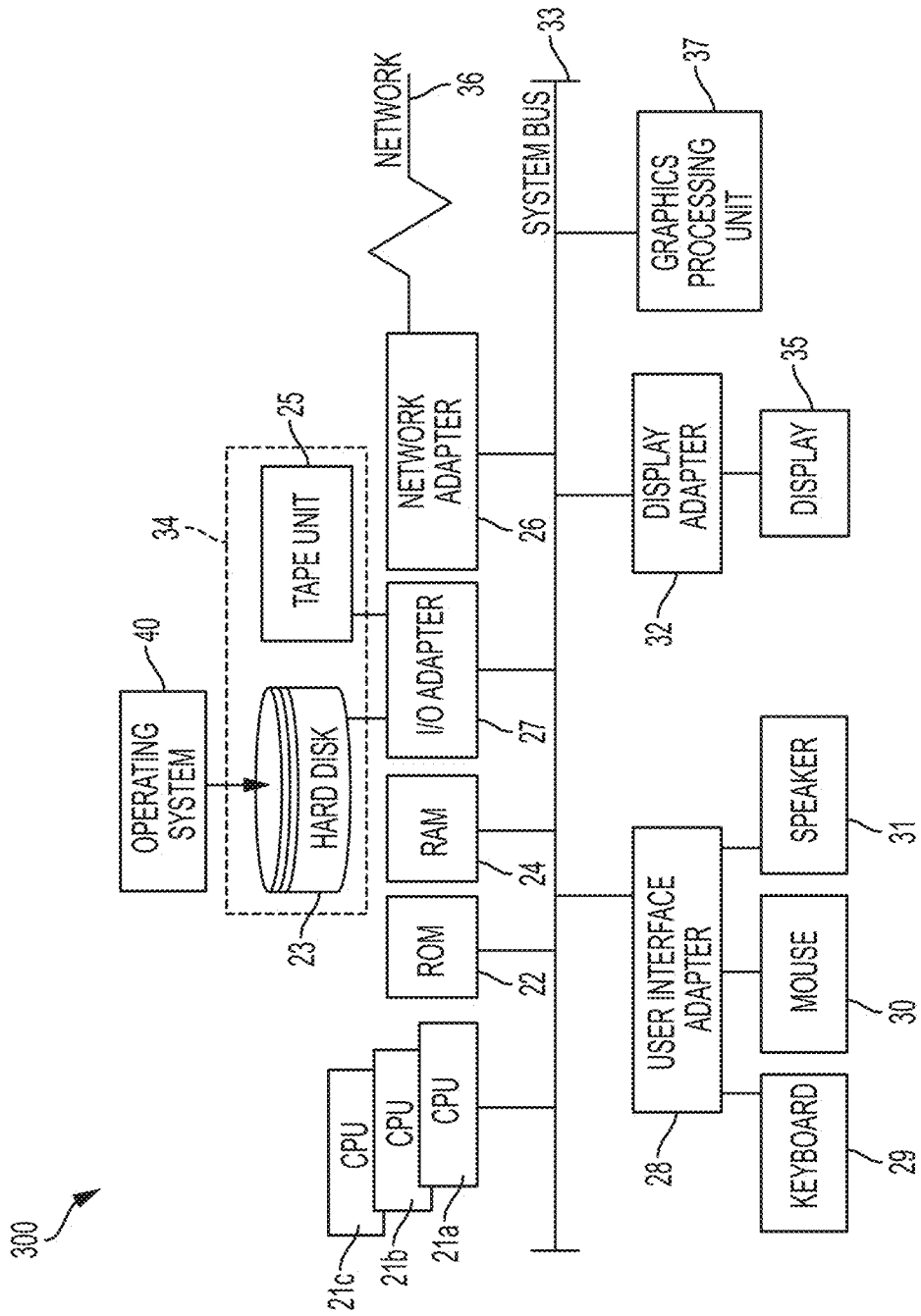
FIG. 3 depicts a processing system for implementing one or more embodiments of the present invention.

It is understood that one or more embodiments of the present invention are capable of being implemented in conjunction with any other type of computing environment now known or later developed. For example, FIG. 3 depicts a block diagram of a processing system 300 for implementing the techniques described herein. The processing system 300 is an example of a computing node 10 of FIG. 1. In the embodiment shown in FIG. 3, processing system 300 has one or more central processing units (processors) 21a, 21b, 21c, etc. (collectively or generically referred to as processor(s) 21 and/or as processing device(s)). According to one or more embodiments of the present invention, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 300.

Further illustrated are an input/output (I/O) adapter 27 and a communications adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 300 can be stored in mass storage 34. The RAM 22, ROM 24, and mass storage 34 are examples of memory 19 of the processing system 300. A network adapter 26 interconnects system bus 33 with an outside network 36 enabling the processing system 300 to communicate with other such systems.

A display (e.g., a display monitor) 35 is connected to system bus 33 by display adaptor 32, which can include a graphics adapter to improve the performance of graphics intensive applications and a video controller. According to one or more embodiments of the present invention, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

According to one or more embodiments of the present invention, processing system 300 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing and has a highly parallel structure that makes it more effective than general-purpose CPUs for algorithms where processing of large blocks of data is done in parallel.

Thus, as configured herein, processing system 300 includes processing capability in the form of processors 21, storage capability including system memory (e.g., RAM 24), and mass storage 34, input means such as keyboard 29 and mouse 30, and output capability including speaker 31 and display 35. According to one or more embodiments of the present invention, a portion of system memory (e.g., RAM 24) and mass storage 34 collectively store an operating system such as the AIX® operating system from IBM Corporation to coordinate the functions of the various components shown in processing system 300.

Figure 4:
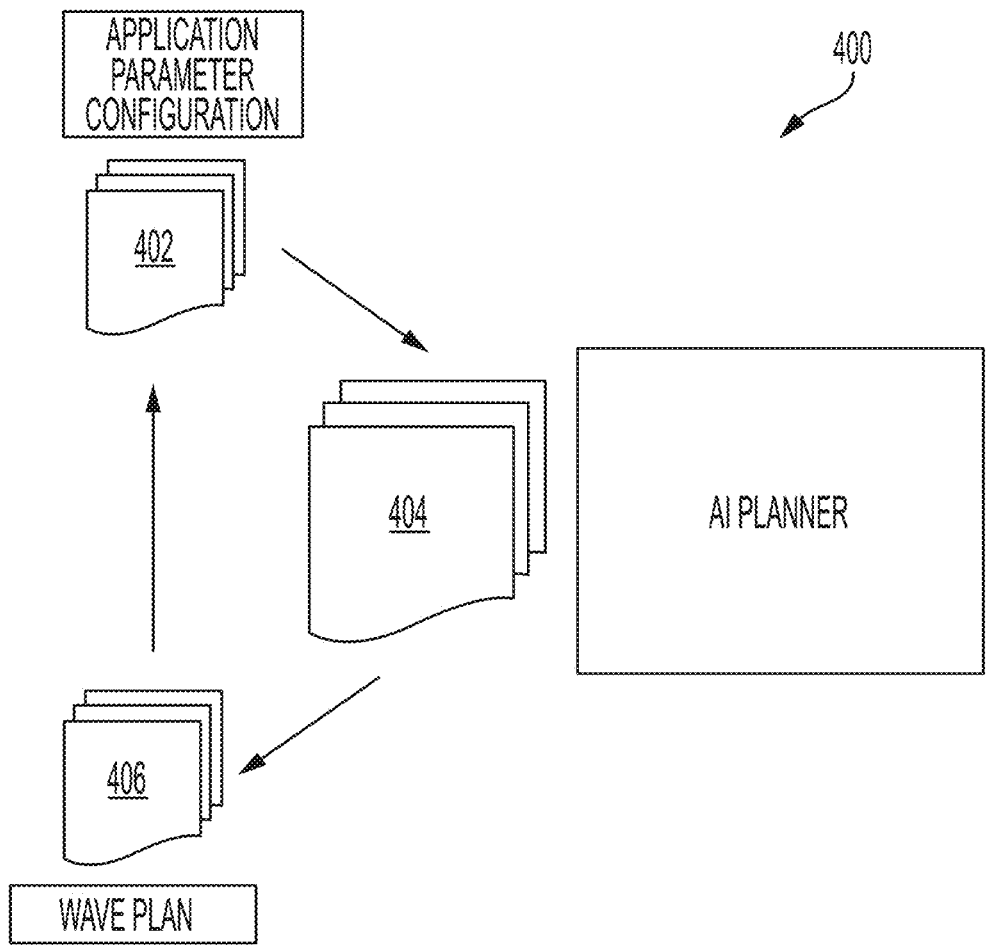
FIG. 4 depicts a block diagram of a user view of a process performed by a pattern-based artificial intelligence (AI) planner for computer environment migration according to one or more embodiments of the present invention.

Turning now to a more detailed description of aspects of the present invention, FIG. 4 depicts a block diagram 400 of a user view of a process performed by a pattern-based AI planner for computer environment migration according to one or more embodiments of the present invention. The block diagram 400 includes: an application parameter configuration file 402 (e.g., in a comma separated value, or "CSV", format); an AI planner 404 (e.g., in an executable, or "EXE", format or in a shell or "SH" format); and a wave plan(s) 406 output by the AI planner 404 (e.g., in a text, or "TXT", format). In accordance with one or more embodiments of the present invention, a wave plan includes one or more waves. Each wave includes a group of applications to be migrated as a group. When a migration includes a large number (e.g., hundreds or thousands) of applications to be migrated to a target environment, the migration can be broken up into several waves, or iterations, with each wave including a subset of the applications to be migrated. Wave planning techniques, as known in the art can be used to determine how to group all of the applications being migrated into waves by taking into account factors such as, but not limited to dependencies between the applications. In accordance with one or more embodiments of the present invent ion, all or a subset of the application parameter configuration file 402, AI planner 404, and wave plan(s) 406 are stored on one or more of the computing node(s) 10 of FIG. 1. In accordance with one or more embodiments of the present invention, the application parameter configuration file 402 includes parameters of migrating applications and the parameters can be input by a user who is requesting the migration plan. The AI planner 404 identifies a migration pattern-based on the input parameters and learned patterns and creates a migration plan that may be broken up into, or include, one or more waves.

The AI planner 404 outputs wave plan(s) 406 with schedules of migrations based on parameter configurations and identified migration patterns. The wave plan(s) 406 are generated using wave planning techniques which include an iterative approach to planning projects that includes adding in additional details as the project proceeds. One or more embodiments of the present invention are not limited to AI planners that generate wave plans. Depending on the type of AI planner being used and/or a number of applications to be migrated, an AI planner may output a single migration plan. Changing parameters during plan execution time may cause conflicts in fulfilling a current plan. As changes to parameters occur, a user can update the parameters and restart the process to generate a new migration plan. In accordance with one or more embodiments of the present invention, the wave plan(s) 406 include a list of tasks to perform in order migrate an application(s) to a target environment, including, for example, a cloud environment. In accordance with one or more embodiments of the present invention, all or a subset of the processing described in reference to FIG. 4 is performed by one or more computing node(s) 10 of FIG. 1.

Figure 5:
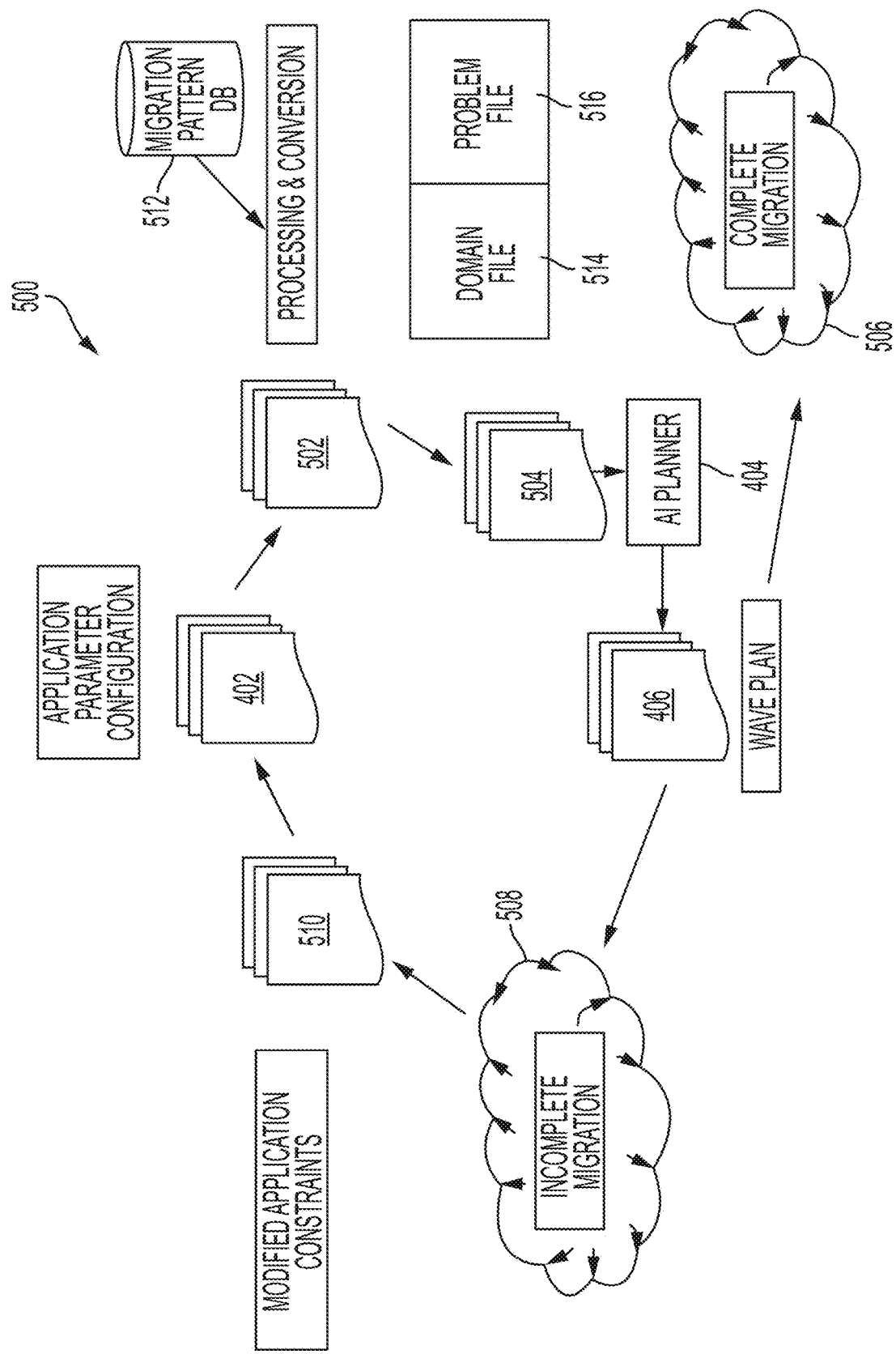
FIG. 5 depicts a block diagram of a process performed by a pattern-based AI planner for computer environment migration according to one or more embodiments of the present invention.

Turning now to FIG. 5, a block diagram 500 of a process performed by a pattern-based AI planner for computer environment migration is generally shown according to one or more embodiments of the present invention. The block diagram 500 includes: application parameter configuration file 402; processing and conversion module 502 (e.g., written in Python); a migration pattern database 512; a domain and problem file 504 (e.g., in a PDDL format) generated by the processing and conversion module 502; AI planner 404; and wave plan(s) 406. The domain and problem file 504 include domain file 514 and problem file 516. The wave plan(s) 406 is carried out, or implemented, and results in either a complete migration 506 to a target (e.g., cloud) environment or an incomplete migration 508 to the target (e.g., cloud) environment. If the migration results in an incomplete migration 508, modified application constraints 510 are input to the application parameter configuration file 402 and a new wave plan(s) 406 is generated, using the processing shown in FIG. 5 and based on contents of the updated application parameter configuration file 402. In accordance with one or more embodiments of the present invention, the processing shown in FIG. 5 continues until it results in a complete migration 506 of the application(s) to the target/cloud environment. In accordance with one or more embodiments of the present invention, all or a subset of the elements and processing shown in FIG. 5 are stored on and/or performed by computing node(s) 10 of FIG. 1.

In accordance with one or more embodiments of the present invention, if no parameters change as the wave plan(s) 406 is being carried out to migrate the application(s) to the target environment, then a complete migration 506 can be achieved without restarting the migration. Alternatively, if any parameters change during the migration, the wave plan 406 may no longer accommodate all of the application parameters correctly, resulting in an incomplete migration 508. When an incomplete migration 508 occurs, changed parameters, including those parameters associated with an completed migration are listed in the modified application constraints 510 and used to update the application parameter configuration file 402. The processing and conversion module 502 generates a new domain and problem file 504 based on the updated application parameter configuration file 402 which is input to the AI planner 404 to generate a new wave plan(s) 406.

An example of an application parameter configuration file 402 that can be utilized as input to one or more embodiments of the present invention is shown below in Table 1.

TABLE 1

| Device Name | Logical CPU | Memory | Effort Hours | Sequence Dependency | Time Dependency Lower | Migration Status |
|---|---|---|---|---|---|---|
| foo1234 | 2 | 10 GB | 2 | foo1235 | 0 | UNMIGRATED |
| foo1235 | 4 | 35 GB | 7 |  | 3 | UNMIGRATED |
| foo1236 | 8 | 8 GB | 10 | foo1235 | 1 | UNMIGRATED |

In the example shown in Table 1, the column labeled "Device Name" indicates that three applications, in this example, servers: foo1234, foo1235, and foo1236 are being migrated to a target environment. A user (e.g., a person or a computer) is requesting a migration plan that includes the migration of all three servers. The column labeled "Logical CPU" in Table 1 indicates the expected logical central processing unit (CPU) allocation (e.g., 2 cores, 4 cores, 8 cores, 16 cores, 32 cores, etc.) required for each application being migrated. The column labeled "Memory" includes the expected storage space allocation (e.g., 100 GB, 500 GB, 1 TB, 2 TB, 5 TB, etc.) required for each of the applications. The column labeled "Effort Hours" in Table 1 refers to the amount of time (e.g., 2 hours, 5 hours, 8 hours, etc.) that the migration of each of the applications is expected to take. The column labeled "Sequence Dependency" indicates other server(s), if any, that must be migrated before the current application, or server, can be migrated. The "Time Dependency Lower" column in Table 1 indicates a calendar time (e.g., start of calendar week 1, 2, 10, etc., with 0 indicating no time dependency), if any, that is the earliest date that the migration of the application can start. The "Migration Status" column indicates the migration status of the application, or server (e.g., migrated or unmigrated).

The application parameter configuration file 402 is input to the processing and conversion module 502 which in accordance with one or more embodiments of the present invention can convert any blank and/or error data to default values. The processing and conversion module 502 further identifies migration patterns based on contents of the migration pattern database 512 and the parameters in the application parameter configuration file 402. An example of a simplified migration pattern database 512 that can be utilized as input to processing and conversion module 502 in accordance with one or more embodiments of the present invention is shown below in Table 2.

TABLE 2

| Action | Task | Task | Task |
|---|---|---|---|
| Migrate_VM | Shutdown_server: client: (status client up): (status client down) | Migration: client wave: (CPU_Capacity wave) > (CPU_Cost client): (CPU_Capacity wave) − (CPU_Cost client | Start_Server: client: (status client down): (status client up), (migration_status client MIGRATED) |
| Migrate_DB2 | Spin_Up_Target_DB2; Wait until (status up) | Migrate_DB2_Data; client: (status client up): (status client up) | Cutover_DB2; client: (status client down): (status client up), (migration_status client MIGRATED) |

As shown in the first row of Table 2, the action of migrating a VM ("Migrate-VM") includes the actions, or tasks, of shutting down the current VM server; verifying that the CPU at the target location has enough capacity; and starting a server for the VM at the target location. Table 2 also shows actions associated with migrating a database ("Migrate_DB2").

In accordance with one or more embodiments of the present invention, a learning engine implementing, for example supervised machine learning based classification, is utilized by the processing and conversion module 502 to find the migration patterns in the migration pattern database 512 and at the same time appropriately classify the input into the known migration patterns using the input parameters such as, but not limited to application properties and constraints. For example, if DB2 was a previously migrated application and its migration was captured as a migration pattern, then when another DB2 migration plan is requested it is recognized as a pattern, and all the conditions, constraints, configurations used by the previous DB2 migration can be reused without further collecting this information. In another example, if a web sphere application (WAS) is currently being migrated, the system can capture the actions, or tasks, performed as part of the migration as a migration pattern, and then use the migration information in the next WAS migration.

Referring to FIG. 5, the processing and conversion module 502 creates domain and problem file 504, which includes domain file 514 and problem file 516, by encoding the application(s) parameter values in the application parameter configuration file 402 and discovered migration patterns from the migration pattern database 512 into appropriate function and state values. An example of a pseudo script that may be implemented by the processing and conversion module 502 follows:

```
#Logical CPU Cost Initialization
for index, row in df .iterrows( ):
```

-continued

```
my_rand = random. randint (2,8)
if len (row)< 2 or type (row[1] ==str or 0 == int(row[1]):
```

-continued

```
        f.write( "(= (cpu _ storaqe_cost "+row[0] + ")
        "+str(my_rand) +")\n")
    else:
        f.write("(= (cpu_storage_cost "+row[0]+")
        "+str(row[1]) +") /n')
f.write ("/n")
#Memory Storage Cost Initialization
for index, row in df.iterrows( ):
    my_rand = random, randint (2,20)
    if len(row) < 3 or type(row[2]) == str or 0 == int(row[2]):
        f.write( "(= (mem_storage_cost "+row[0]+")
        "+str(my_rand)+")")
    else:
        f.write( "(= (mem_ storaqe_cost "+row"0 "+") "+
        str(row[2]) +")/n")
f.write ("/n")
```

The pseudo script shown above generates logic used in the domain files. The example above includes CPU and memory cost initialization which are used as conditions in the domain files. In the example shown above, cpu_storage_cost and mem_storage_cost are checked to verify that they are satisfied in order to progress with the migration. The checking of the conditions as shown above is performed using a comparison to ensure that target (e.g., cloud) environment is suitable for the conditions. For example, the cpu_storage_cost should be less than the desired or offered cost to pass the condition verification about CPU storage cost.

In accordance with one or more embodiments of the present invention, the domain file 514 specifies possible actions, functions, and states for any set of application parameter configuration file(s) 402 to reach the goal state. An example of a domain file 514 written in PDDL follows:

```
(:action fill_w_client_-argl-_from_dependent_-arg2-
    :parameters (?wave - wave ? client - client ?target - client)
    :precondition
    (and
    (>= (mem_capacity ? wave) (mem_storage_cost ?client))
    (>= (cpu capcity ? wave) (cpu_storage_cost ?client))
    (>= (effort_hrs_capacity ?wave) (effort_hrs_cost ?client))
    (>= (time_line (migration_window_lower ?client))
    (or
    (sequence_dependency ?client no ?target) and (sequence_dependecy
    ?client yes ?target) (migration_stat :effect
    (and
    (decrease (mem_capacity ?wave) mem?storage_cost ?client))
    (decrease (cpu capcity ? wave) (cpu_storage_cost ?client))
    (decrease (effort_hrs_capacity ?wave) (effort_hrs_cost ?client))
    (migration_status ?client migrated)
    (not (migration_status ?client unmigrated))
    )
)
(:action start_new_wave_with_type
    :parameters (?wave - wave)
    :precondition (and)
    :effect
    (and
    (decrease (mem_capacity ?wave) (mem_capacity ?wave))
    (increase (mem_capacity ?wave) (mem_limit ?wave))
    (decrease (cpu capacity ?wave) (cpu capacity ?wave))
    (increase (cpu capcity ?wave (cpu capcity ? wave))
    (decrease (effort_hrs_capcity ?wave) (effort_hrs_capacity ?wave
    (increase (effort_hrs_capacity ?wave (effort_hrs_limit ?wave))
    (increase (time_line) 1)
)
```

The domain file shown above provides logic with parameters and preconditions. In the example shown above, the dependency is checked to determine whether one server depends on the other server, which means that they should be migrated together. In addition, CPU, memory, effort hours are used as parameters for the preconditions.

In accordance with one or more embodiments of the present invention, the problem file 516 includes an encoded form of the servers, or applications, and their parameters. An example of a problem file written in PDDL and corresponding to the example application parameter configuration file 402 shown above follows:

(=(cpu_storage_cost foo1234) 2)
(=(cpu_storage_cost foo1235) 4)
(=(cpu_storage_cost foo1236) 8)
(=(mem_storage_cost foo1234) 10)
(=(mem_storage_cost foo1235) 35)
(=(mem_storage_cost foo1236) 8)
(=(effort_hrs_cost foo1234) 2)
(=(effort_hrs_cost foo1235) 7)
(=(effort_hrs_cost foo1236) 10)
(sequence_dependency foo1234 yes foo1235)
(sequence_dependency foo1235 no foo1235)
(sequence_dependency foo1236 yes foo1235)
(=(migration_window_lower foo1234) 0)
(=(migration_window_lower foo1235) 3)
(=(migration_window_lower foo1236) 1)

In accordance with one or more embodiments of the present invention, the wave plan file(s) 406 includes a list of tasks for performing the migration of an application(s), in this example, the three servers, to a target/cloud environment. The wave plan file(s) 406 is built by the AI planner 404 solving the problem specified by the problem file 516 in the domain specified by the domain file 514. The AI planner 404 outputs a list with an order for migrating the application (s) included in the application parameter configuration file 402. The order can be with respect to capacity for a number of applications in each wave of migration. During the generation of the plan by the AI planner 404, the AI planner 404 saves data learned from different migration pattern cases to the migration pattern database 512 to improve the generating of future migration plans. An example of a wave plan file 406 written in a text format follows:

task 0: START_NEW_WAVE_WITH_TYPE WAVE1
    1:    FILL_W_CLIENT_-ARG1-_FROM_DEPENDENT_-ARG2-WAVE1 FOO1236 F001236
    2: START_NEW_WAVE_WITH_TYPE WAVE1
    3:    FILL_W_CLIENT_-ARG1-_FROM_DEPENDENT_-ARG2-WAVE1 FOO1234 F001234
    4: START_NEW_WAVE_WITH_TYPE WAVE1
    5:    FILL_W_CLIENT_-ARG1-_FROM_DEPENDENT_-ARG2-WAVE1 FOO1235 F001235

The wave plan file shown above illustrates an example migration plan with all migration actions, or tasks. To carry out the migration, migration executors or experts review this list of tasks and follow each task in sequence. Some of the tasks may be executed by migration automation tools if available. Each wave is a unit of migration activity that can be performed as a unit. The migration tasks shown above are listed as a dependency sequence, specifying an order for the tasks to be performed.

The example application parameter configuration file 402, migration patterns database 512, script for the processing and conversion module 502, domain file 514, problem files 516, and wave plan file 406 shown above are provided as an aid in describing aspects of embodiments of the present invention and are not intended to be limiting. In addition, the examples include just a subset of typical contents as an aid to describing aspects of embodiments. One skilled in the art will recognize that a variety of other methods, contents, and formats can also be implemented to perform the processing described herein.

Figure 6:
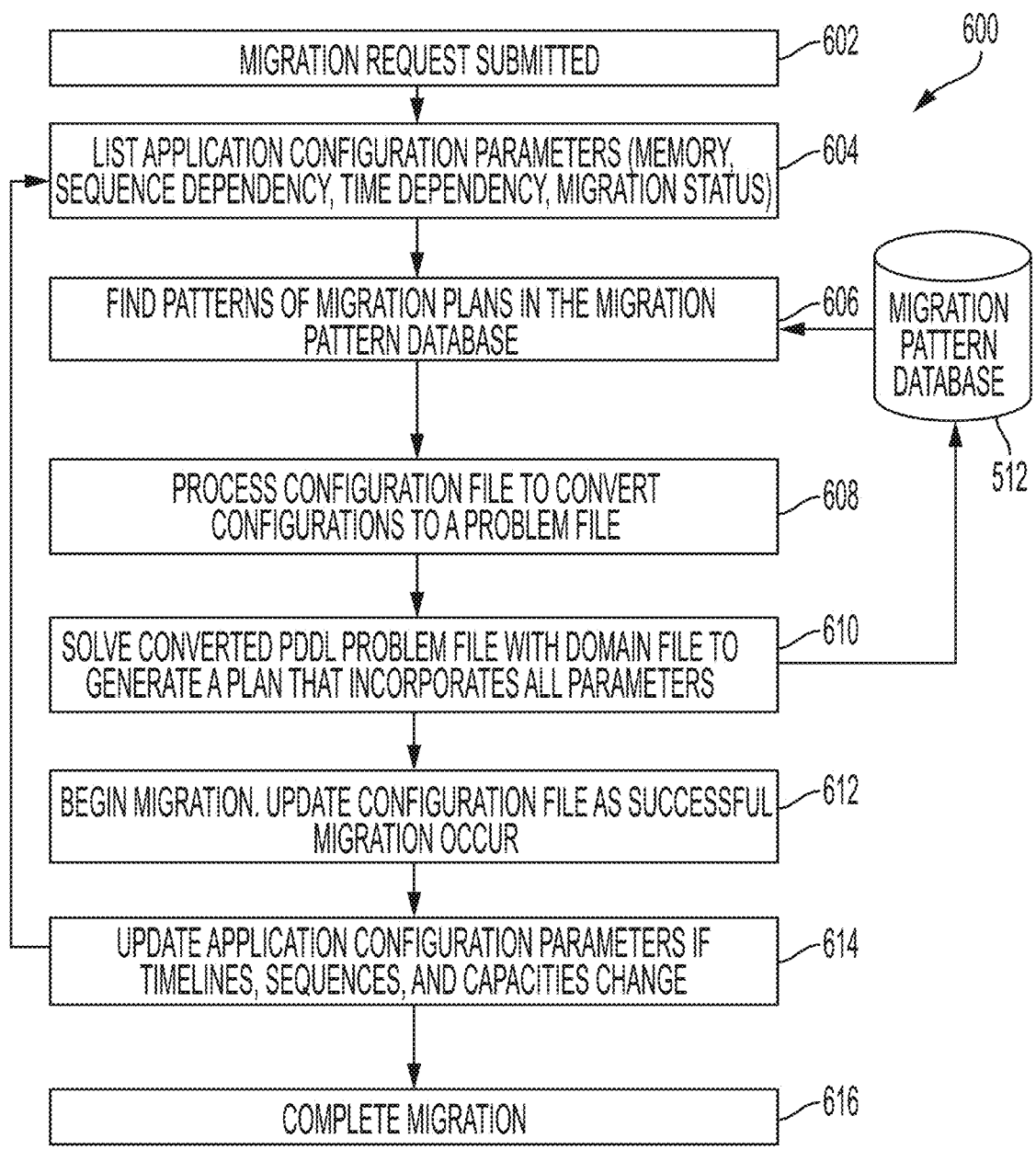
FIG. 6 depicts a flow diagram of a process for migrating an application to a computer environment according to one or more embodiments of the present invention.

Turning now to FIG. 6, a flow diagram 600 of a process for migrating an application to a target environment is generally shown according to one or more embodiments of the present invention. At least a subset of the process shown in FIG. 6 can be performed, for example by process and conversion module 502 and/or AI planner 404 executing on a processor such as one or more computing nodes 10 of FIG. 1. At block 602, a migration request is submitted by a user to migrate an application(s) to a target/cloud environment, and at block 604 application configuration parameters of the application(s) are listed. The application configuration parameters can be input or received by the user and stored in a file such as application parameter configuration file 402 of FIG. 4. At block 606, patterns of migration plans are located, or identified, in the migration pattern database 512 and used to generate a domain file, such as domain file 514 of FIG. 5. In accordance with one or more embodiments of the present invention, locating patterns of migration plans in the migration pattern database 512 includes matching properties of applications to decide whether or not the pattern is matched with a particular input application.

At block 608 of FIG. 6, the application parameter configuration file is processed to create a problem file, such as problem file 516 of FIG. 5. At block 610, the problem file and the domain file are input to an AI planner, such as AI planner 404 of FIG. 4, to generate a migration plan that incorporates all of the parameters input at block 604. In addition, the migration pattern database 512 is updated with the plan generated at block 610 for use in the generation of future domain files. The migration to the target/cloud environment begins at block 612 and the application parameter configuration file is updated as applications specified in the migration plan are successfully migrated. At block 614, the application configuration parameters input at block 604 are updated, e.g., via user input, and the migration planning is restarted if changes that impact the migration have occurred such as, but not limited to: timeline changes, sequence changes, and capacity changes. At block 616, the migration is complete.

Figure 7:
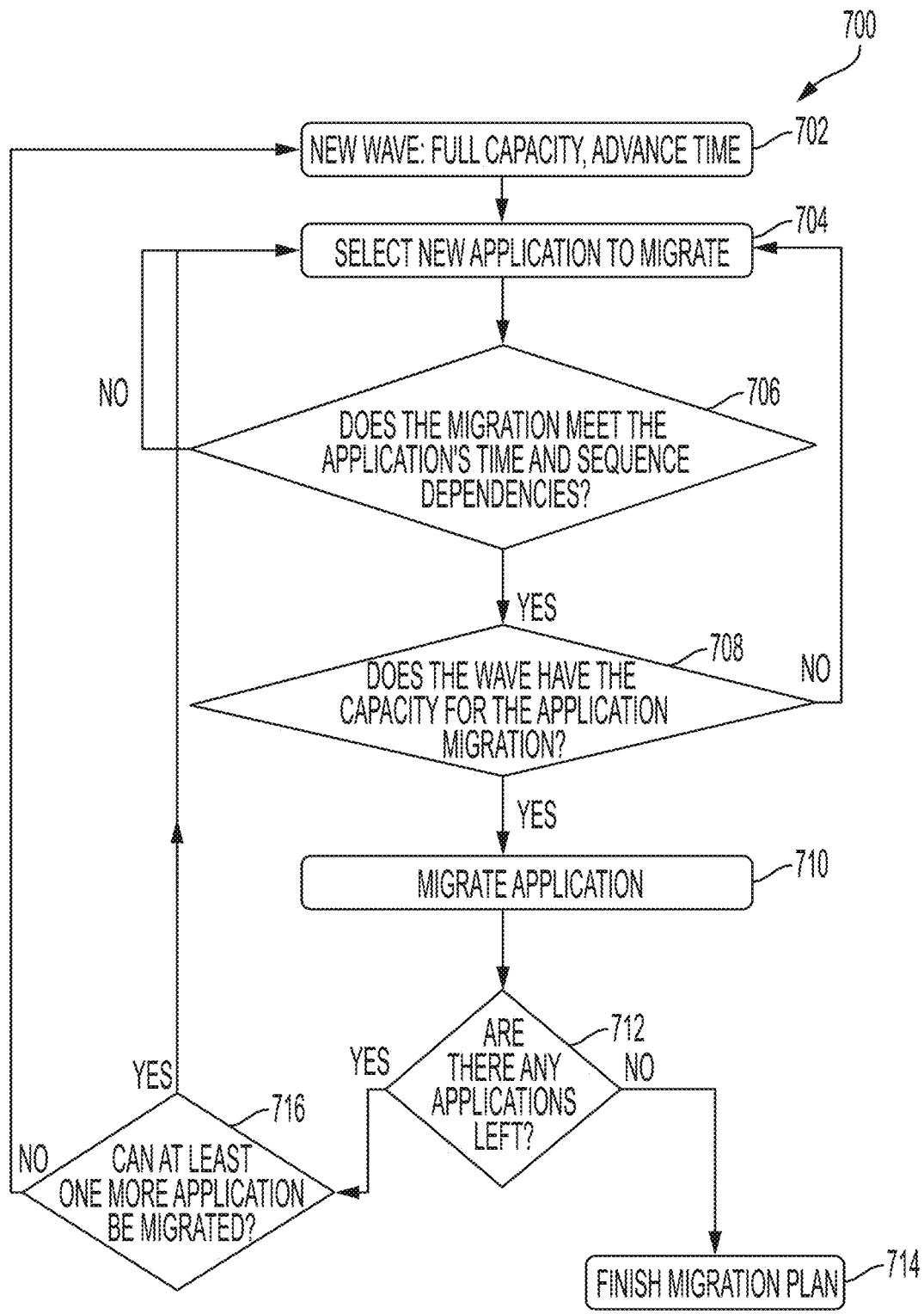
FIG. 7 depicts a flow diagram of a planning process according to one or more embodiments of the present invention.

Turning now to FIG. 7, a flow diagram 700 of a planning process is generally shown according to one or more embodiments of the present invention. At least a subset of the processing shown in FIG. 7 can be performed by an AI planner such as AI planner 404 of FIG. 4 executing on a processor such as computing node 10 of FIG. 1. The planning process shown in FIG. 7 can be used to generate a plan to migrate a plurality of applications to a target/cloud environment. The embodiment of the planning process shown in FIG. 7 can be utilized to implement an arbitrary selection of applications for inclusion in a wave of a migration plan given that each application has a status of unmigrated, that time and sequence dependencies are met, and that a current wave has capacity for the chosen application. At block 702 a new wave is started with full capacity available. At block 704 a new application is selected for inclusion in the migration plan. It is determined at block 706 whether the migration of the application meets the application's specified time and sequence dependencies. If it is determined at block 706 that the application's time sequence dependencies will not be met, then processing continues at block 704 with selecting a new application to migrate as part of the migration plan.

If it is determined at block 706 that the application's time sequence dependencies will be met, then processing continues at block 708 with determining whether the wave has the capacity for the application migration. If it is determined at block 708, that the wave does not have the capacity for the application migration, then processing continues at block 704 with selecting a new application to include in the migration plan. If it is determined at block 708, that the wave has the capacity for the application migration, then processing continues at block 710 with putting the tasks, or actions, to migrate the application into the migration plan.

It is determined at block 712 applications have a status of unmigrated. If there are other applications with a status of unmigrated that are not in the migration plan, then processing continues at block 716 with determining whether the wave has capacity to add another application. Processing continues at block 702 with creating a new wave if the current wave does not have additional capacity. Processing continues at block 704 with selecting a new application to migrate as part of the migration plan if it is determined at block 716 that the current wave has capacity to migrate another application.

If it is determined at block 712 that there are no other applications with a status of unmigrated that are not in the plan, then processing continues at block 714 with the migration plan being complete. At block 714, all of the applications that were requested to be included in a migration plan have been included in a wave of the migration plan.

Figure 8:
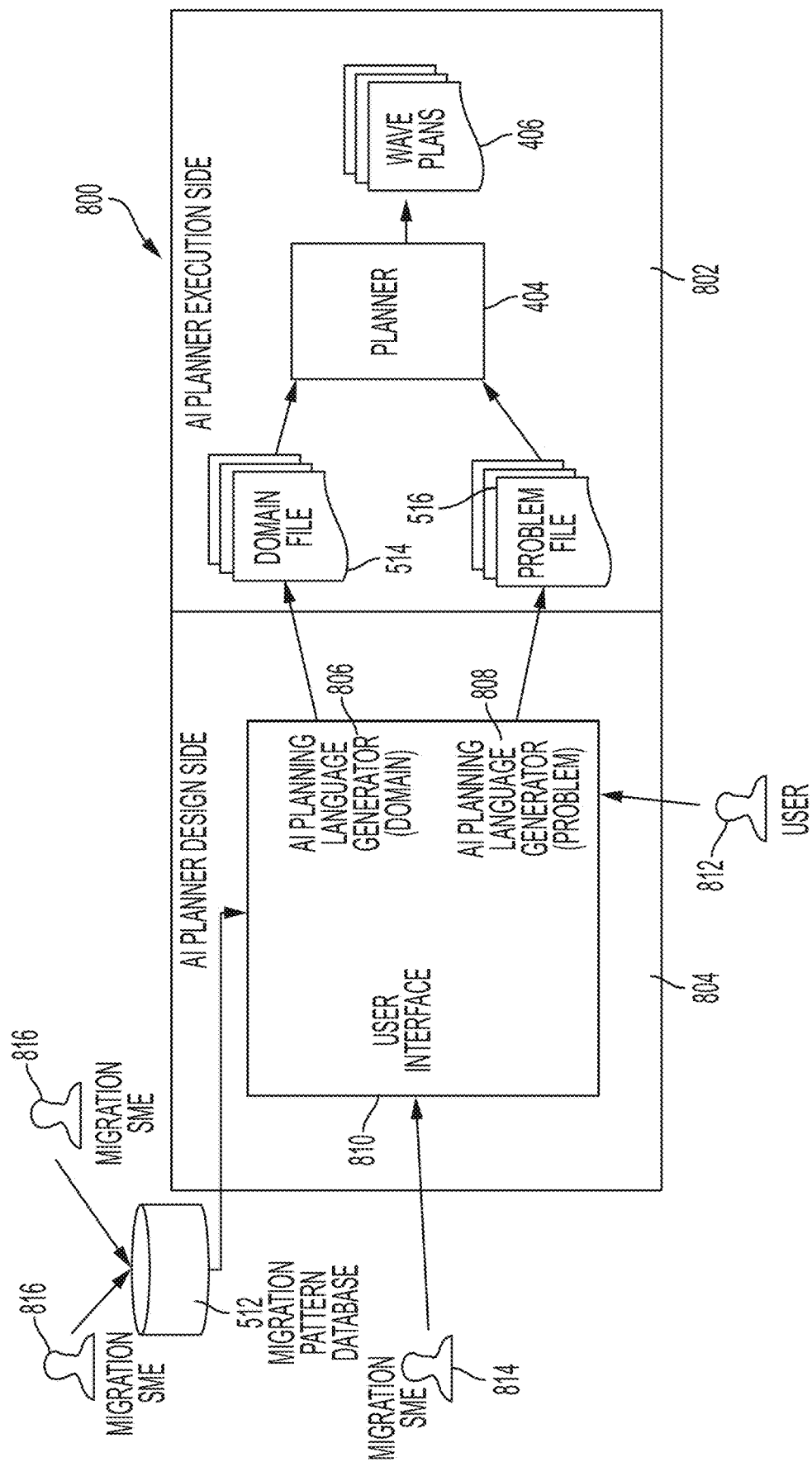
FIG. 8 depicts a block diagram of a user view of a process performed by a pattern-based AI planner for computer environment migration that uses data injection in accordance with one or more embodiments of the present invention.

Turning now to FIG. 8, a block diagram 800 of a user view of a process performed by a pattern-based AI planner for computer environment migration that uses data injection is generally shown in accordance with one or more embodiments of the present invention. The block diagram 800 includes an AI Planner Design Side 804 and an AI Planner Execution Side 802. In accordance with one or more embodiments of the present invention, all or a subset of the AI Planner Design Side 804 and the AI Planner Execution Side 802 utilize one or more of the computing node(s) 10 of FIG. 1 for storage and processing.

The AI Planner Execution Side 802 shown in FIG. 8 includes domain file 514, problem file 516, AI planner 404, and wave plan 406 which were described previously with respect to FIG. 4 and FIG. 5.

The AI Planner Design Side 804 can be implemented, for example, by processing and conversion module 502 described previously with respect to FIG. 5. The AI Planner Design Side 804 shown in FIG. 8 includes user interface 810, AI planning language generator (domain) module 806 which generates domain file 514, and AI planning language generator (problem) module 808 which generates problem file 516. The AI Planner Design Side 804 shown in FIG. 8 receives input from a migration subject matter expert (SME) 814 via user interface 810. The migration SME 814 can, for example, submit a knowledge base that includes all of the parameters needed for the waves and the applications. The knowledge base from the migration SME 814 can be stored in the migration pattern database 512, and used at a later point in time to match the migration status and constraints. Also shown in FIG. 8, are migration SMEs 806 updating a centralized migration pattern database 512 which as described previously specifies actions to take based on different types of migrations. As used herein, the term "migration type" refers to the migration categorization such as retain, retire, re-host, re-platform, re-factor, re-architect and so on. Also shown in FIG. 8, is a user 812 submitting source documents in a user friendly formats, such as an application list with properties, into AI planning language generator (problem) module 808. This user 812 does not need to know about the AI planner 404, but is made aware of the tasks output from the AI planner 404.

The separation of roles can be done based on the knowledge or role of each type of person. The migration SMEs 816 are knowledgeable about the details of how the AI planner 404 works and they use this knowledge to provide input to the creation of migration pattern database 512 which is used by the AI planner 404 to generate migration plans. Migration SMEs 816 are contrasted with the users 812, who do not need to know about how AI planner 404 works. The users 812 just need to know how to specify the applications to be migrated to the AI planner 404 and be able to understand the migration plans output from the AI planner 404. Splitting the knowledge required by different users and SMEs can benefit both roles by allowing them to focus on their particular area of expertise.

Figure 9:
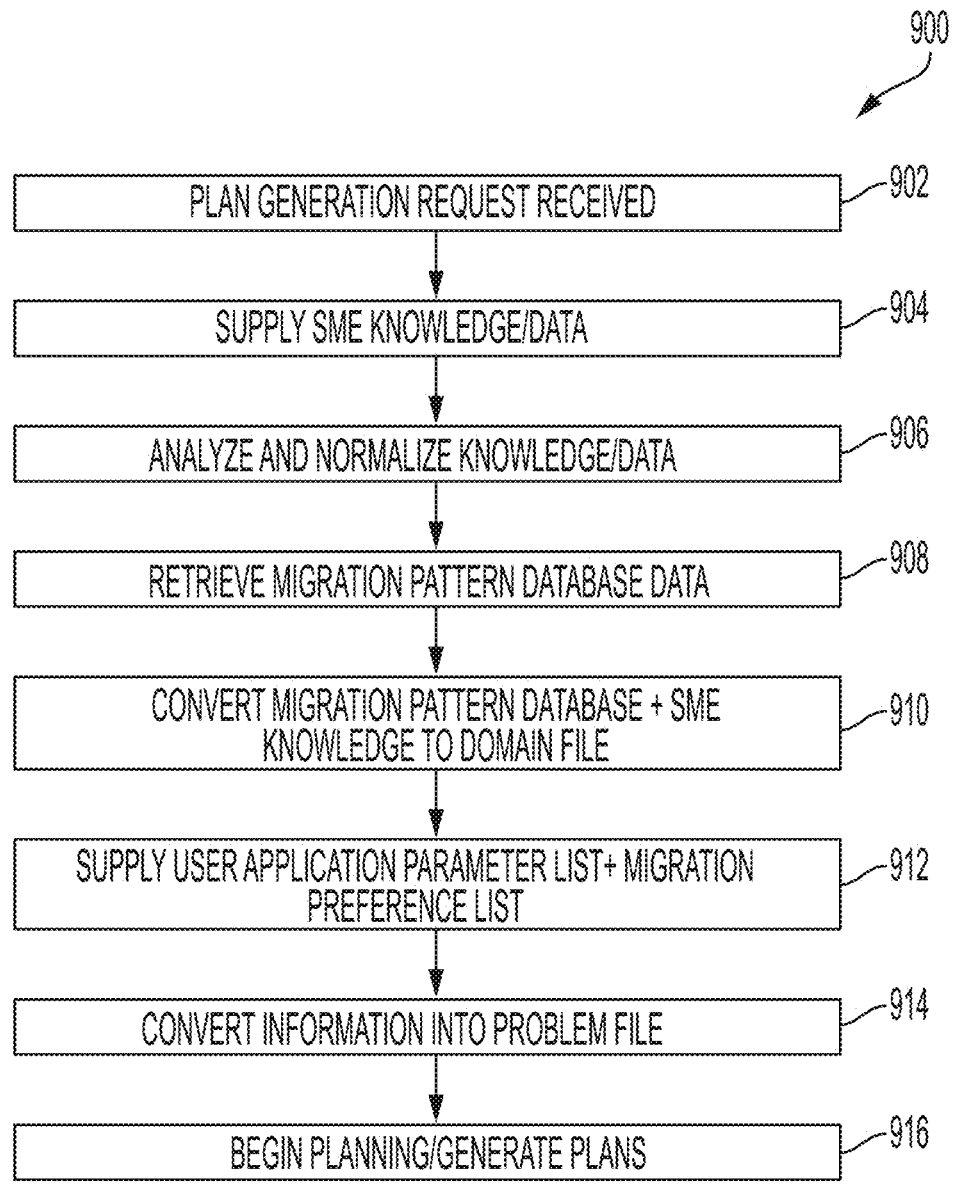
FIG. 9 depicts a flow diagram of a process for data injection in accordance with one or more embodiments of the present invention.

Turning now to FIG. 9, a flow diagram 900 of a process for data injection is generally shown in accordance with one or more embodiments of the present invention. At least a subset of the processing shown in FIG. 9 can be performed using the AI planner design side 804 and/or the AI planner execution side 802 of FIG. 8 executing on one or more computing nodes 10 of FIG. 1. At block 902, a request to generate a plan to migrate one or more applications from a source environment to a target environment (e.g., on a cloud) is received. At block 904, SME knowledge and data is provided for example, by migration SME 814 of FIG. 8, and at block 906 the knowledge is analyzed and normalized. In accordance with one or more embodiments of the present invention, the knowledge and data includes migration actions, conditions, constraints, and other data that can help formulate the migration plans. The analysis at block 906 can include creating a vector of meaningful terms. For example "RAM" is a keyword that is of concern for the migration. The normalization of data can be performed by standardizing the terms. For example, "RAM" can become "memory", and "CPU consumption" can be changed to "CPU usage."

At block 908, data from the migration pattern database, such as migration pattern database 512, is retrieved and used at block 910 along with SME knowledge, such as that provided by migration SME 816 of FIG. 8, to generate a domain file, such as domain file 514. The domain file can be generated by the AI planning language generator (domain) module 806 of FIG. 8.

At block 912, an application parameter list and a migration preference list are supplied and converted at block 914 into a problem file, such as problem file 516. The converting at block 914 can be performed for example, by AI planning language generator (problem) module 808 of FIG. 8. The application parameter list can be implemented, for example, by application parameter configuration file 402 of FIG. 4. The migration preferences are used as precondition or constraints in the AI planner. This will guide how or where to migrate certain applications. For example, the preference may include that the target is an IBM Cloud environment, specifically.

At block 916 of FIG. 9, the problem file and domain file are input to an AI planner, such as AI planner 404 to generate a migration plan(s).

Figure 10:
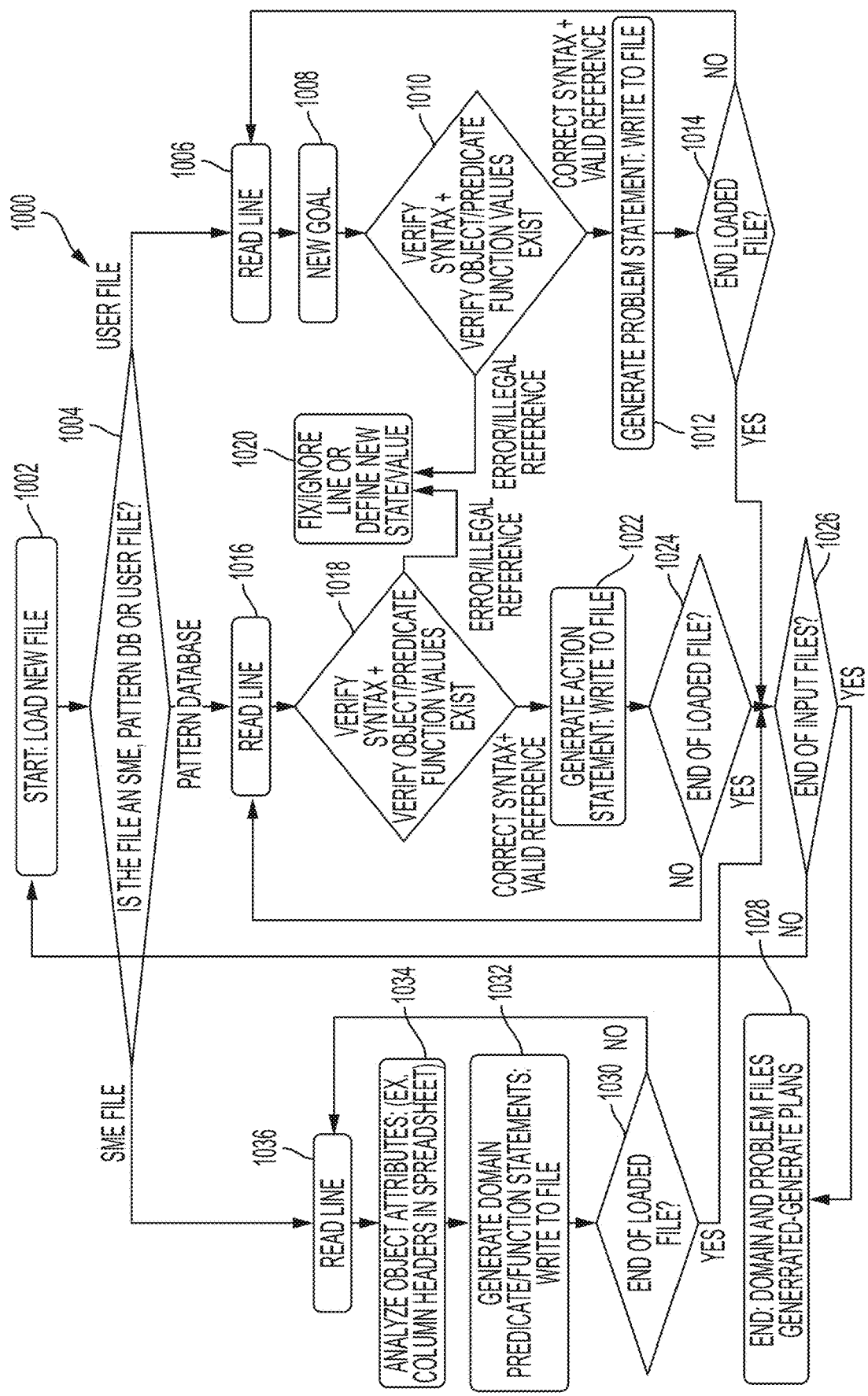
FIG. 10 depicts a flow diagram of a process for generating domain and problem files according to one or more embodiments of the present invention.

Turning now to FIG. 10, a flow diagram 1000 of a process for generating domain and problem files is generally shown according to one or more embodiments of the present invention. The processing shown in FIG. 10 can be performed, for example, by AI Planner Design Side 804 of FIG. 8. At block 1002, a new file is inserted and at block 1004, it is determined whether the file is SME input, a pattern database, or a user file. If the input is a SME file, then the file includes domain information that is used to generate a domain file, such as domain file 514 of FIG. 5, and processing continues at block 1036 to generate at least a portion of the domain file. The processing shown in blocks 1036, 1034, 1032, and 1030 can be performed, for example by AI planning language generator (domain) module 806 of FIG. 8. At block 1036, a line from the input file is read and at block 1036 object attributes are analyzed. At block 1032, domain predicate/function statements are generated and written to the domain file. In accordance with one or more embodiments of the present invention, the domain file includes predicates and actions such as, but not limited to:

(define (domain <domain name>)

<PDDL code for predicates>

<PDDL code for first action>

...

<PDDL code for last action>)

At block 1030, it is determined if there are more lines in the file. If there are more lines, then block 1036 is performed, otherwise processing continues at block 1026.

If it is determined at block 1004, that the input includes a pattern database, then contents of the input pattern database are used to generate the migration pattern database, such as migration pattern database 512 of FIG. 5, and processing continues at block 1016 to generate at least a portion of the migration pattern database. The processing shown in blocks 1016, 1018, 1020, 1022, and 1024 can be performed, for example by AI planning language generator (domain) module 806 of FIG. 8. At block 1016, a line from the input pattern database is read and at block 1018 the syntax of the line is verified along with verifying that the object/predicate/function values exist and complete. Any missing values or incomplete values may stop the AI planner. If it is determined at block 1018 that the line has correct syntax and a valid reference, then block 1022 is performed to generate an action statement to write the line to the migration pattern database. At block 1024, it is determined if there are more lines in the file. If there are more lines, then block 1016 is performed, otherwise processing continues at block 1026. If it is determined at block 1018 that the line does not have correct syntax and a valid reference, then block 1020 is performed to make a determination about whether to fix the line, ignore the line or to define new object, predicate and/or function value. Processing then continues at block 1022 or block 1024.

If it is determined at block 1004, that the input includes a user file, then the file includes problem information that is used to generate a problem file, such as problem file 516 of FIG. 5, and processing continues at block 1006 to generate at least a portion of the problem file. The processing shown in blocks 1006, 1008, 1010, 1020, 1012, and 1014 can be performed, for example by AI planning language generator (problem) module 808 of FIG. 8. At block 1006, a line from the user file is read and at block 1008 a new goal is generated. At block 1010, the syntax of the line is verified along with verifying that the object/predicate/function values exist. If it is determined at block 1010 that the line has correct syntax and a valid reference, then block 1012 is performed to generate a problem statement to the problem file. At block 1014, it is determined if there are more lines in the file. If there are more lines, then block 1006 is performed, otherwise processing continues at block 1026. If it is determined at block 1010 that the line does not have correct syntax and a valid reference, then block 1020 is performed to make a determination about whether to fix the line, ignore the line or to define new object, predicate and/or function value. Processing then continues at block 1012 or block 1014.

Processing continues at block 1002 if it is determined at block 1026, that there are additional input files. If it is determined at block 1026 that there are no more input files, then processing continues at block 1028 with outputting the domain and problem files for input to an AI planner.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Many of the functional units described in this specification have been labeled as modules. Embodiments of the invention apply to a wide variety of module implementations. For example, a module can be implemented as a hardware circuit including custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like. Modules can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together, but can include disparate instructions stored in different locations which, when joined logically together, include the module and achieve the stated purpose for the module.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
receiving, using a processor, a request to generate a migration plan for migrating an application from a source environment to a target environment, the request comprising configuration parameters of the application;
identifying, using the processor, based at least in part on the configuration parameters of the application, a set of possible actions that can be performed to migrate the application from the source environment to the target environment;
generating, using the processor, the migration plan based at least in part on the request and the identified set of possible actions, the migration plan specifying a subset of the set of possible actions, the generating including executing an artificial intelligence (AI) engine to identify patterns in the identified set of possible actions;
outputting the migration plan;
receiving user input comprising an update to the set of possible actions; and
updating the migration plan based at least in part on the user input,
wherein the identifying comprises accessing a database of actions and selecting the set of possible actions from the database,
wherein the database is updated based on one or both of the user input and actions performed in previous migrations, and
wherein the actions performed in previous migrations are automatically extracted and input to the database.

2. The computer-implemented method of claim 1, wherein the AI engine includes an AI planner.

3. The computer-implemented method of claim 2, wherein the source environment and the configuration parameters of the application are input to the AI planner as a problem file and the identified set of possible actions are input to the AI planner as a domain file.

4. The computer-implemented method of claim 1, wherein the target environment comprises a cloud environment.

5. The computer-implemented method of claim 1, further comprising receiving a request for the migration plan to include actions to migrate at least one additional application from the source environment to the target environment.

6. A system comprising:
a memory having computer readable instructions: and
one or more processors for executing the computer readable instructions, the computer readable instructions controlling the one or more processors to perform operations comprising:
receiving, using a processor, a request to generate a migration plan for migrating an application from a source environment to a target environment, the request comprising configuration parameters of the application;
identifying, using the processor, based at least in part on the configuration parameters of the application, a set of possible actions that can be performed to migrate the application from the source environment to the target environment;
generating, using the processor, the migration plan based at least in part On the request and the identified set of possible actions, the migration plan specifying a subset of the set of possible actions, the generating including executing an artificial intelligence (AI) engine to identify patterns in the identified set of possible actions;
outputting the migration plan;
receiving user input comprising an update to the set of possible actions; and
updating the migration plan based at least in part on the user input,
wherein the identifying comprises accessing a database of actions and selecting the set of possible actions from the database,
wherein the database is updated based on one or both of the user input and actions performed in previous migrations, and
wherein the actions performed in previous migrations are automatically extracted and input to the database.

7. The system of claim 6, wherein the AI engine includes an AI planner.

8. The system of claim 7, wherein the source environment and the configuration parameters of the application are input to the AI planner as a problem file and the identified set of possible actions are input to the AI planner a domain tile.

9. The system of claim 6, wherein the target environment comprises a cloud environment.

10. The system of claim 6, wherein the operations further comprise receiving a request for the migration plan to include actions to migrate at least one additional application from the source environment to the target environment.

11. A computer program product comprising a computer readable storage medium having program instructions embodied therewith, the program instructions executable by a processor to cause the processor to perform operations comprising:
receiving, using a processor, a request to generate a migration plan for migrating an application from a source environment to a target environment, the request comprising configuration parameters of the a.pplication;
identifying, using the processor, based at least in part on the configuration parameters of the application, a set of possible actions that can be performed to migrate the application from the source enviromnent to the target environment;
generating, using the processor, the migration plan based at least in part on the request and the identified set of possible actions, the migration plan specifying a subset of the set of possible actions, the generating including executing an artificial intelligence (AI) engine to identify patterns in the identified set of possible actions;
outputting the migration plan;
receiving user input comprising an update to the set of possible actions; and
updating the migration plan based at least in part on the user input,
wherein the identifying comprises accessing a database of actions and selecting the set of possible actions from the database,
wherein the database is updated based on one or both of the user input and actions performed in previous migrations, and
wherein the actions performed in previous migrations are automatically extracted and input to the database.

12. The computer program product of claim 11, wherein the generating the migration plan is performed by an artificial intelligence (AI) planner.

13. The computer program product of claim 11, wherein the target environment comprises a cloud environment.

14. The computer program product of claim 11, wherein the operations further comprise receiving a request for the migration plan to include actions to migrate at least one additional application from the source environment to the target environment.

\* \* \* \* \*